US010624121B2

(12) United States Patent
Karaki et al.

(10) Patent No.: US 10,624,121 B2
(45) Date of Patent: Apr. 14, 2020

(54) SCHEDULING AN UPLINK TRANSMISSION OVER AN UNLICENSED RADIO RESOURCE

(71) Applicant: Telefonaktiebolaget LM Ericsson (publ), Stockholm (SE)

(72) Inventors: Reem Karaki, Aachen (DE); Jung-Fu Cheng, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 16/079,311

(22) PCT Filed: Feb. 24, 2017

(86) PCT No.: PCT/EP2017/054334
§ 371 (c)(1),
(2) Date: Aug. 23, 2018

(87) PCT Pub. No.: WO2017/144665
PCT Pub. Date: Aug. 31, 2017

(65) Prior Publication Data
US 2019/0104540 A1 Apr. 4, 2019

Related U.S. Application Data

(60) Provisional application No. 62/300,755, filed on Feb. 26, 2016.

(51) Int. Cl.
*H04W 72/14* (2009.01)
*H04W 72/12* (2009.01)
(Continued)

(52) U.S. Cl.
CPC ........... *H04W 72/14* (2013.01); *H04W 16/14* (2013.01); *H04W 72/0446* (2013.01); *H04W 72/0453* (2013.01); *H04W 72/1278* (2013.01); *H04W 72/1289* (2013.01); *H04W 74/0808* (2013.01)

(58) Field of Classification Search
CPC ... H04L 5/0055; H04L 1/1812; H04L 5/0053; H04L 5/0091; H04L 1/0006;
(Continued)

(56) References Cited

U.S. PATENT DOCUMENTS

2005/0036456 A1* 2/2005 Laroia ............... H04W 52/0216
370/328
2013/0039296 A1 2/2013 Damnjanovic et al.
2018/0242319 A1* 8/2018 Akkarakaran ........ H04W 72/12

OTHER PUBLICATIONS

"3GPP TS 36.321 V12.7.0", 3rd Generation Partnership Project; Technical Specification Group Radio Access Network; Evolved Universal Terrestrial Radio Access (E-UTRA); Medium Access Control (MAC) protocol specification (Release 12), Sep. 2015, pp. 1-77.
(Continued)

*Primary Examiner* — Natasha W Cosme
(74) *Attorney, Agent, or Firm* — Sage Patent Group

(57) ABSTRACT

A scheduling node (14) in a wireless communication system is configured for scheduling an uplink transmission on an unlicensed radio resource. The scheduling node (14) is configured to detect whether or not the scheduling node (14) has transmitted or scheduled to receive on the unlicensed radio resource in a subframe. The scheduling node (14) is also configured to transmit a joint grant with a grant delay that is based on whether or not the scheduling node (14) has transmitted or scheduled to receive on the unlicensed radio resource in a subframe according to the detecting. The grant delay is a delay between transmission of the joint grant and an earliest one of multiple subframes granted by the joint grant for uplink transmission on the unlicensed radio resource.

20 Claims, 18 Drawing Sheets

(51) Int. Cl.
*H04W 16/14* (2009.01)
*H04W 72/04* (2009.01)
*H04W 74/08* (2009.01)

(58) Field of Classification Search
CPC ............. H04L 1/1896; H04L 25/03101; H04L 27/2666; H04L 47/29; H04L 47/32; H04L 5/0044; H04L 5/14; H04L 1/0002; H04L 1/0017; H04L 1/005; H04L 1/1854; H04L 1/1867; H04L 2012/5674; H04L 27/2607; H04L 47/14
USPC ......................................................... 370/329
See application file for complete search history.

(56) References Cited

OTHER PUBLICATIONS

"3GPP TS 36.211 V11.4.0", 3rd Generation Partnership Project; Technical Specification Group Radio Access Network; Evolved Universal Terrestrial Radio Access (E-UTRA); Physical channels and modulation (Release 11), Sep. 2013, pp. 1-120.

"3GPP TS 36.213 V11.4.0", 3rd Generation Partnership Project; Technical Specification Group Radio Access Network; Evolved Universal Terrestrial Radio Access (E-UTRA); Physical layer procedures (Release 11), Sep. 2013, pp. 1-182.

"3GPP TS 36.331 V11.5.0", 3rd Generation Partnership Project; Technical Specification Group Radio Access Network; Evolved Universal Terrestrial Radio Access (E-UTRA); Radio Resource Control (RRC); Protocol specification (Release 11), Sep. 2013, pp. 1-347.

"3GPP TR 36.889 V13.0.0", 3rd Generation Partnership Project; Technical Specification Group Radio Access Network; Study on Licensed-Assisted Access to Unlicensed Spectrum; (Release 13), Jun. 2015, pp. 1-87.

"Further consideration on joint grant for up to 32 CCs", 3GPP TSG RAN WG1 Meeting #82, R1-154418, Beijing, China, Aug. 24-28, 2015, pp. 1-2.

"On Scheduling Methods for Enhanced LAA", 3GPP TSG RAN WG1 Meeting #84, R1-160995, St. Julian's, Malta, Feb. 15-19, 2016, pp. 1-5.

* cited by examiner

SCHEDULING AN UPLINK TRANSMISSION OVER AN UNLICENSED RADIO RESOURCE

BACKGROUND

A licensed radio resource is a resource (e.g., in frequency) to which a license holder has been granted exclusive rights, e.g., by a government agency such as the Federal Communications Commission, FCC, in the United States. With exclusive rights, the license holder may transmit on a licensed radio resource without interference or resource crowding. This may allow the license holder to maximize resource efficiency and signal quality. Licensed radio resources are limited in number, though, which in turn limits their ability to meet the ever increasing demand for larger throughput from applications and services. Moreover, licensed radio resources are difficult and expensive to acquire.

By contrast, an unlicensed radio resource is a resource (e.g., in frequency) to which no license holder has been granted exclusive rights. Such a resource may therefore be simultaneously used by multiple operators or technologies, without the difficulty and expense associated with a licensed radio resource. Because the resource is shared, though, regulatory requirements may not permit transmissions on the unlicensed radio resource without first ensuring that the transmissions will not unduly interfere with other transmissions on the unlicensed radio resource (e.g., those that are already ongoing). This may be accomplished by performing a so-called clear channel assessment (CCA) or listen-before-talk (LBT) procedure, whereby a transmission is performed if the unlicensed radio resource is declared as idle but is otherwise deferred. An unlicensed radio resource may be used exclusively (e.g., by a MultiFire system) or be used as a complement to a licensed radio resource (e.g., by a Long Term Evolution Unlicensed, LTE-U, or Licensed-Assisted Access, LAA, system).

Use of an unlicensed radio resource proves complicated in some contexts, though. One such context occurs where a scheduling node schedules a transmission on the unlicensed radio resource in advance, e.g., on a dynamic basis. In doing so, the scheduling node "grants" the resource for a certain device to transmit or receive a transmission. The scheduling node accordingly transmits a so-called grant to that device. Notably, however, actual performance of the scheduled transmission still depends on the unlicensed radio resource being free for transmission when the time comes for the transmission to occur. Successful transmission of the grant to the device may also depend on the unlicensed radio resource being free for transmission, if that grant is transmitted on the unlicensed radio resource as well. These aspects complicate scheduling in a way that makes it difficult to optimize resource efficiency, latency, overhead, and throughput.

SUMMARY

One or more embodiments herein include a method performed by a scheduling node in a wireless communication system for scheduling an uplink transmission on an unlicensed radio resource. The method comprises detecting whether or not the scheduling node has transmitted or scheduled to receive on the unlicensed radio resource in a subframe. The method also comprises transmitting a joint grant with a grant delay that is based on whether or not the scheduling node has transmitted or scheduled to receive on the unlicensed radio resource in a subframe according to the detecting. The grant delay is a delay between transmission of the joint grant and an earliest one of multiple subframes granted by the joint grant for uplink transmission on the unlicensed radio resource.

The method in some embodiments further comprises determining the grant delay with which the joint grant is to be transmitted, by determining the earliest one of the multiple subframes to be granted by the joint grant, based on whether or not the scheduling node has scheduled to receive on the unlicensed radio resource in a subframe according to the detecting.

In this case, the determining may comprise determining the earliest one of the multiple subframes to be later or earlier in time based respectively on whether the scheduling node has or has not scheduled to receive on the unlicensed radio resource in a subframe according to the detecting.

Alternatively or additionally, the joint grant may be transmitted with a grant delay that is either greater than a minimum required delay or equal to the minimum required delay based respectively on whether the scheduling node has or has not scheduled to receive on the unlicensed radio resource in a subframe according to the detecting.

Alternatively or additionally, the joint grant may be transmitted with a grant delay that is either dependent on or independent of a number of subframes granted by the joint grant based respectively on whether the scheduling node has or has not scheduled to receive on the unlicensed radio resource in a subframe according to the detecting.

Alternatively or additionally, the joint grant may be transmitted with a grant delay that is either equal to a certain number of subframes plus a number of subframes granted by the joint grant or is less than the certain number of subframes plus a number of subframes granted by the joint grant, based respectively on whether the scheduling node has or has not transmitted or scheduled to receive on the unlicensed radio resource in a subframe according to the detecting. In this case, the certain number of subframes may in some embodiments be either two subframes, three subframes, or four subframes.

Regardless, detection by the scheduling node may entail detecting whether or not the scheduling node has scheduled to receive on the unlicensed radio resource in a subframe. In this case, the detection may involve detecting whether or not the scheduling node has scheduled to receive on the unlicensed radio resource in a subframe occurring after a subframe in which the joint grant is to be transmitted.

Alternatively or additionally, detection by the scheduling node may entail detecting whether or not the scheduling node has transmitted on the unlicensed radio resource in a subframe. In this and other cases, detection may involve detecting whether or not the scheduling node has transmitted the joint grant in a subframe. For example, responsive to detecting that the scheduling node has not transmitted the joint grant in the subframe, the scheduling node may transmit the joint grant in a subsequent subframe occurring after the subframe, with the joint grant still granting the same multiple subframes despite transmission in the subsequent subframe instead of the subframe.

In some embodiments, the joint grant is transmitted in a subframe previously scheduled by the scheduling node for uplink transmission.

Alternatively or additionally, the joint grant may be transmitted over multiple subframes, with a last one of the multiple subframes comprising a partial subframe preceded by a full subframe.

In some embodiments, the scheduling node provokes or maintains uninterrupted interlacing of joint grants and scheduled uplink transmissions by transmitting the joint grant with a grant delay that is based on whether or not the scheduling node has transmitted or scheduled to receive on the unlicensed radio resource in a subframe according to the detecting.

In one or more embodiments, the joint grant is transmitted in a second slot of a subframe. In this case, such transmitting may comprise, responsive to failing to transmit the joint grant in a first slot of a subframe, transmitting the joint grant in a second slot of the same subframe, the second slot occurring after the first slot.

Alternatively or additionally, the scheduling node may transmit the joint grant on the unlicensed radio resource.

In some embodiments, the scheduling node is a base station.

Embodiments also include a scheduling node in a wireless communication system for scheduling an uplink transmission on an unlicensed radio resource. The scheduling node is configured to detect whether or not the scheduling node has transmitted or scheduled to receive on the unlicensed radio resource in a subframe; and transmit a joint grant with a grant delay that is based on whether or not the scheduling node has transmitted or scheduled to receive on the unlicensed radio resource in a subframe according to the detecting. Again, the grant delay is a delay between transmission of the joint grant and an earliest one of multiple subframes granted by the joint grant for uplink transmission on the unlicensed radio resource.

The scheduling node may be configured to perform any aspects of the method as described above.

Further embodiments include a computer program comprising instructions which, when executed by at least one processor of a scheduling node, causes the scheduling node to carry out the method of any of the embodiments herein.

Moreover, embodiments also include a carrier containing the computer program. The carrier may be one of an electronic signal, optical signal, radio signal, or computer readable storage medium.

DETAILED DESCRIPTION

Figure 1:
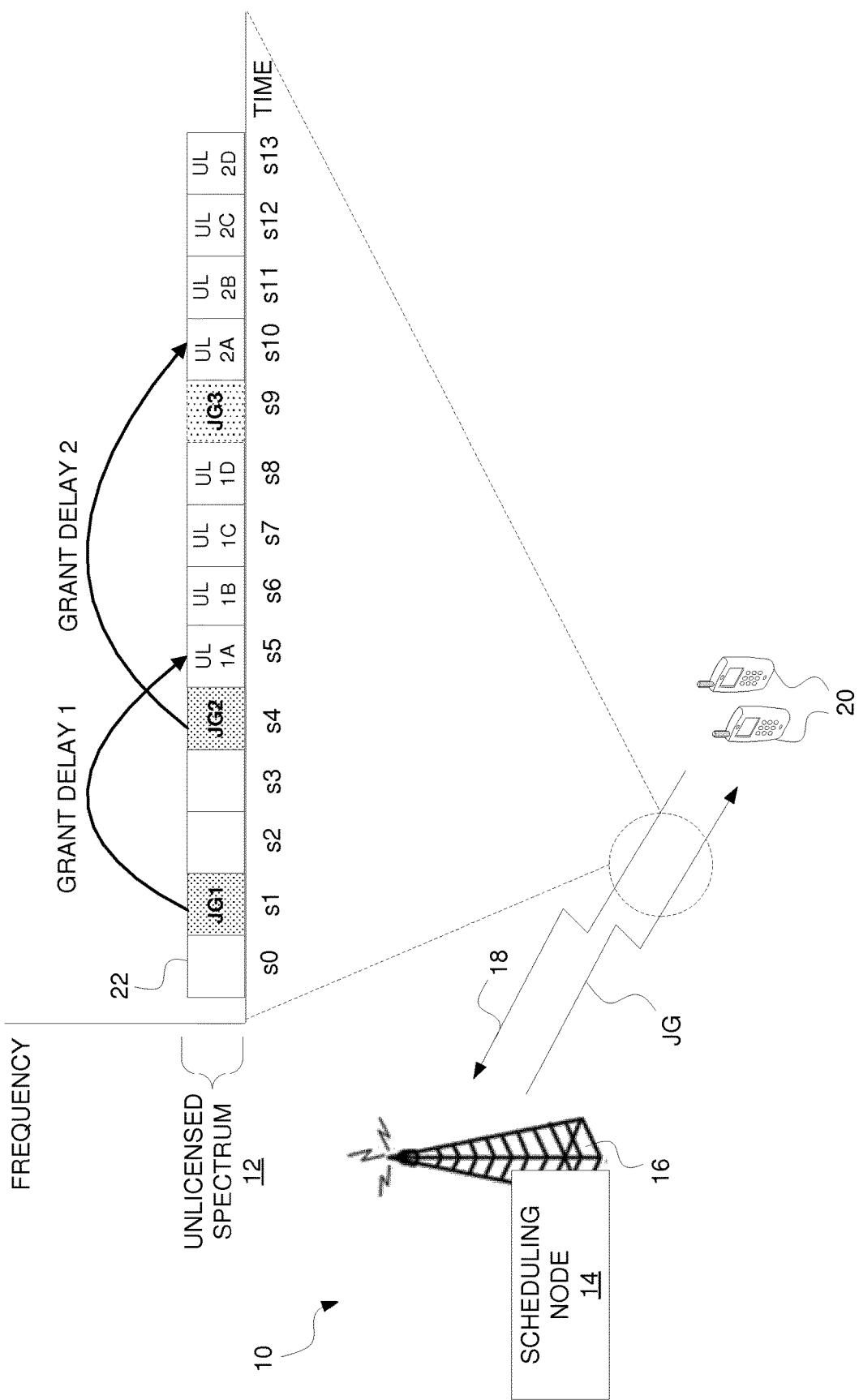
FIG. 1 is a block diagram of a wireless communication system according to some embodiments.

FIG. 1 illustrates a wireless communication system 10. The wireless communication system 10 in some embodiments operates at least in part on an unlicensed radio resource (e.g., over unlicensed spectrum 12). The system 10 may for example be a Long Term Evolution Unlicensed (LTE-U) system (e.g., based on 3GPPP Rel. 10/11/12 and defined by the LTE-U forum), or a License Assisted Access (LAA) system (e.g., as defined by 3GPP release 13) that uses an anchor in licensed spectrum, but also employs unlicensed spectrum. Or, the system 10 may be a MulteFire (i.e., standalone LTE) system that does not require an anchor in licensed spectrum.

Operating at least in part on an unlicensed radio resource such as unlicensed spectrum 12, transmissions are contentious or contention-based, e.g., amongst multiple different types of systems. In some embodiments, for instance, a clear channel assessment (CCA) or Listen Before Talk (LBT) period must be performed prior to performing a transmission on the unlicensed resource. The transmission may be performed only if the CCA or LBT declares that the resource is not already controlled by some other transmission or node, i.e., that the resource is "idle". If the unlicensed resource is already controlled, such that the CCA or LBT declares the resource busy, the transmission may be deferred until the resource is deemed to no longer be controlled.

In this context, the system 10 is configured to perform transmissions on the unlicensed resource according to a structure that divides the time domain into subframes 22 (e.g., of 1 ms in length, although other durations are contemplated herein). FIG. 1 as an example shows fourteen subframes in the time domain labelled s0-s13. Transmission in any given subframe 22 may be performed in some embodiments if a CCA or LBT is completed successfully (e.g., with an "idle" result) prior to transmitting in that subframe 22. The CCA or LBT may for instance be performed at the beginning of the subframe 22, or immediately prior to the subframe 22.

A scheduling node 14 in the system 10 is shown in FIG. 1 as incorporated in or otherwise associated with a radio network node 16 (e.g., such as a base station or eNB in LTE). The scheduling node 14 schedules uplink transmissions 18 on the unlicensed resource, e.g., to occur in certain subframes 22. These uplink transmissions 18 are performed by one or more wireless communication devices 20, e.g., to the radio network node 16.

The scheduling node 14 in this regard grants certain subframes to be used for uplink transmission, e.g., by certain devices 20. The scheduling node 14 may transmit an "individual" grant that indicates the granting of a single subframe 22 for uplink transmission, e.g., by a single device. Or, the scheduling node 14 may by contrast transmit a "joint" grant that jointly grants multiple subframes 22 for uplink transmission, e.g., by one or more different devices 20. U.S. Provisional Patent Application No. 62/205,024 is incorporated by reference herein and describes a joint grant in this regard that jointly grants a wireless device a burst of uplink subframes (SFs) using multi-subframe scheduling, known as joint grant transmission, e.g., to reduce the overhead.

No matter the type of grant, there exists a delay between when the scheduling node 14 transmits the grant and when the earliest subframe 22 granted by the grant occurs. This is referred to as the "grant delay" as used herein. In particular, the grant delay for a joint grant is the delay between when the scheduling node 14 transmits the joint grant and when the earliest ones of multiple subframes 22 granted by the joint grant occurs.

FIG. 1 for example shows that the scheduling node 14 transmits a joint grant JG1 in subframe s1. This joint grant JG1 jointly grants multiple subframes s5, s6, s7, and s8 for uplink transmission (i.e., UL1A, UL1B, UL1C, and UL1D, respectively) on the unlicensed radio resource. The scheduling node 14 transmits this joint grant JG1 with a grant delay of four subframes (shown as Grant Delay 1). This is because the earliest subframe granted by the joint grant JG1 occurs as subframe s5 (i.e., s5−s1=4 subframes).

By contrast, the scheduling node 14 transmits another joint grant JG2 in subframe s4. This joint grant JG2 jointly grants multiple subframes s10, s11, s12, and s13 for uplink transmission (i.e., UL2A, UL2B, UL2C, and UL2D, respectively) on the unlicensed radio resource. The scheduling node 14 transmits this other joint grant JG2 with a grant delay of six subframes (shown as Grant Delay 2). This is because the earliest subframe granted by the other joint grant JG2 occurs as subframe s10 (i.e., s10−s4=6 subframes).

According to some embodiments, therefore, the grant delay of a joint grant may be variable, selectable, or adaptable, e.g., on a joint grant by joint grant basis, such that different joint grants may have different grant delays. For example, criteria based on which the grant delay of a joint grant is variable, selectable, or adaptable may include whether or not the scheduling node 14 has transmitted or scheduled to receive on the unlicensed radio resource in a subframe. Basing a joint grant's grant delay on such criteria may improve resource efficiency, reduce transmission latency, minimize overhead, and/or increase throughput in some embodiments.

Figure 2:
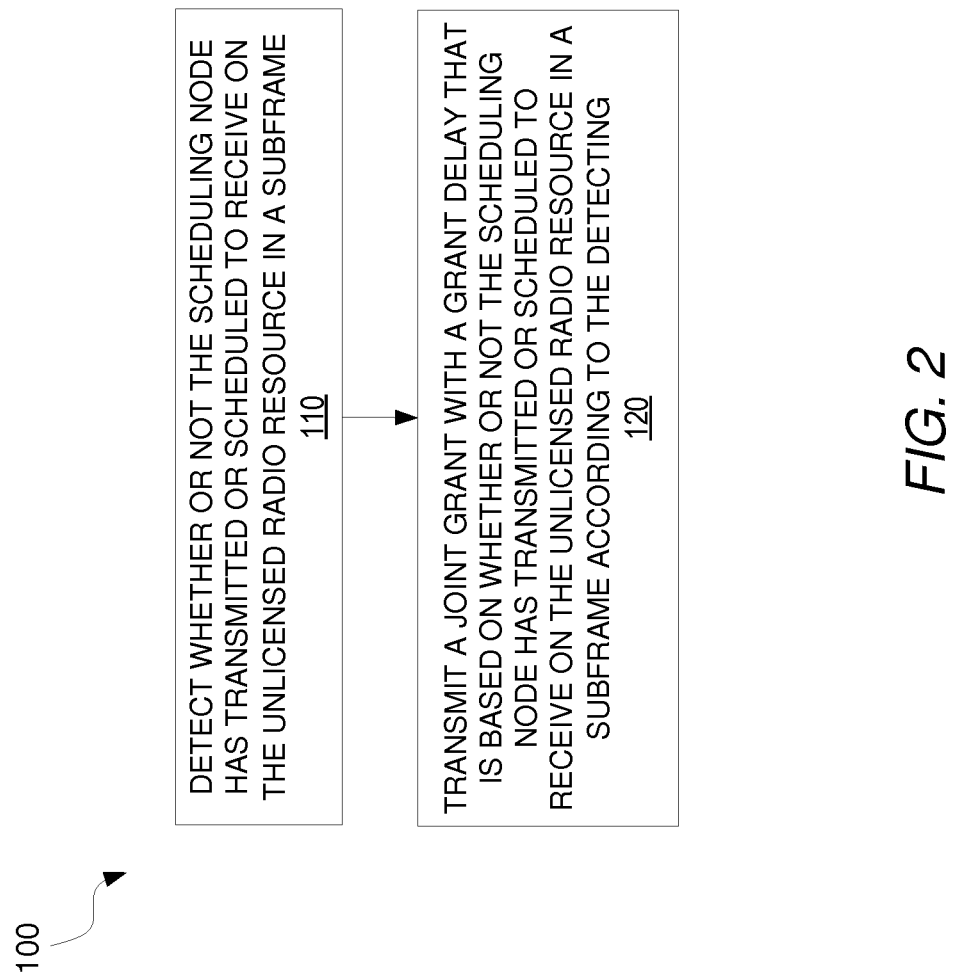
FIG. 2 is a logic flow diagram of a method performed by a scheduling node according to some embodiments.

FIG. 2 illustrates additional details regarding processing 100 performed by the scheduling node 14 according to some embodiments. As shown, processing 100 includes detecting whether or not the scheduling node 14 has transmitted or scheduled to receive on the unlicensed radio resource in a subframe (Block 110). Processing 100 also includes transmitting a joint grant with a grant delay that is based on whether or not the scheduling node 14 has transmitted or scheduled to receive on the unlicensed radio resource in a subframe according to the detecting (Block 120). With the grant delay being the delay between transmission of the joint grant and an earliest subframe granted by the joint grant, for example, the transmission timing of the joint grant may be based on the detecting and/or the earliest subframe granted by the joint grant may be based on that detecting.

Consider for instance embodiments where the grant delay is based on whether or not the scheduling node 14 has scheduled to receive on the unlicensed radio resource in a subframe. In this case, the grant delay may be based on whether or not the scheduling node 14 has scheduled to receive on the unlicensed radio resource in a subframe occurring after a subframe in which the joint grant is to be transmitted. That is, prior to transmitting the joint grant in a certain subframe, the scheduling node 14 may detect whether or not it has scheduled to receive on the unlicensed radio resource in a subframe occurring after that certain subframe, and may transmit the joint grant with a grant delay that depends on the outcome of that detection.

Referring back to FIG. 1 in this regard, prior to transmitting a joint grant (e.g., JG1 or JG2), the scheduling node 14 may detect whether or not it has scheduled to receive on the unlicensed radio resource in a subframe occurring after the subframe in which the joint grant is to be transmitted (e.g., in the subframe s2 occurring immediately after the subframe s1 in which joint grant JG1 is to be transmitted, or in the subframe s5 occurring immediately after the subframe s4 in which joint grant JG2 is to be transmitted). In some embodiments, this detection may be performed as part of detecting whether any uplink transmission is scheduled to occur after transmission of the joint grant. Regardless, the scheduling node 14 may transmit the joint grant with a grant delay that is based on this detection. The scheduling node 14 may for instance determine the earliest one of the multiple subframes to be granted by the joint grant, based on the detection. With this determined, the scheduling node 14 may generate the joint grant to grant that earliest subframe determined and then transmit the joint grant in the planned subframe.

In the example of FIG. 1, for instance, the scheduling node 14 detects that it is not scheduled to receive on the unlicensed radio resource in the subframe s2 occurring after the subframe s1 in which the joint grant JG1 is to be transmitted. Based on detecting this, the scheduling node 14 determines that the earliest subframe to be granted by the joint grant JG1 is to be subframe s5, such that the grant delay is four subframe (s5−s1=4). Had the scheduling node 14 detected otherwise, the scheduling node 14 in this example would have determined that the earliest subframe to be granted by joint grant JG1 is to be subframe s7, such that the grant delay would have been six subframes instead of four subframes. Indeed with respect to joint grant JG2, FIG. 1 shows that prior to transmitting joint grant JG2, the scheduling node 14 detects that it has scheduled to receive on the unlicensed radio resource in the subframe s5 occurring after the subframe s4 in which the joint grant JG2 is to be transmitted (in fact, that subframe s5 was scheduled by joint grant JG1). Based on detecting this, the scheduling node 14 determines that the earliest subframe to be granted by the joint grant JG2 is to be subframe s10, such that the grant delay is six subframes (s10−s4=6). As this example demonstrates, therefore, the earliest subframe granted by a joint grant may be later or earlier in time based respectively on whether the scheduling node 14 has or has not scheduled to receive on the unlicensed radio resource in a subframe. In this way, the grant delay of any given joint grant may depend or be based on whether an uplink transmission is scheduled to occur in a subframe.

While the value of a grant delay was illustrated in the above example as being either four subframes or six subframes, depending on the scheduling node's detection, embodiments herein are not so limited. In one or more embodiments, for example, the scheduling node 14 may transmit a joint grant with a grant delay that is either dependent on or independent of a number of subframes granted by the joint grant, based respectively on whether the scheduling node 14 has or has not scheduled to receive on the unlicensed radio resource in a subframe according to the detecting. With reference to FIG. 1, for instance, the six subframe grant delay of joint grant JG2 may be dependent on the number of subframes (namely, four subframes) granted by the joint grant JG2, because the scheduling node 14 has scheduled to receive on the unlicensed radio resource in subframe s5. In particular, the six subframe grant delay may be equal to L+2 subframes, where L is the number of subframes granted by the joint grant JG2. By contrast, the four subframe grant delay of joint grant JG1 may be independent of the number of subframes (namely, four subframes) granted by the joint grant JG1, because the scheduling node 14 has not scheduled to receive on the unlicensed radio resource in subframe s2. Independent of the number of subframes granted, the four subframe grant delay of joint grant JG1 may be less than L+2 subframes, where L is the number of subframes granted by the joint grant JG1.

Alternatively or additionally in this regard, the scheduling node 14 in some embodiments transmits a joint grant with a grant delay that is either greater than a minimum required delay or equal to the minimum required delay based respectively on whether the scheduling node 14 has or has not scheduled to receive on the unlicensed radio resource in a subframe according to the detecting. This minimum required delay may be required in order for a wireless communication device 20 to be able to receive and process (e.g., decode) the joint grant in time for actually receiving an uplink transmission scheduled by the joint grant. This timing constraint may be imposed by hardware or other processing constraints of a device, propagation time of the channel, or the like.

Effectively, then, some embodiments herein transmit a joint grant (e.g., JG1) with as small of a grant delay as possible (e.g., with a minimum required delay, such as 4 subframes), when the scheduling node 14 has not scheduled to receive on the unlicensed radio resource in a subframe (e.g., subframe s2). If for instance there are no uplink transmissions currently scheduled, the scheduling node 14 uses as small of a grant delay as possible so as to schedule the uplink transmission as soon as possible. This minimizes latency of the uplink transmission as well as minimizes the number of unused subframes in the interim between grant transmission and the uplink transmission. By contrast, when the scheduling node 14 has already scheduled to receive on the unlicensed radio resource in a subframe (e.g., subframe s5), the scheduling node 14 may transmit a joint grant (e.g., JG2) with a grant delay larger than the minimum required delay (e.g., with a grant delay of L+2 subframes), as needed to achieve one or more objectives, such as uninterrupted interlacing of joint grants and uplink transmissions.

Indeed, the scheduling node 14 in some embodiments may base a joint grant's grant delay on the detection herein as part of provoking or maintaining uninterrupted interlacing of joint grants and scheduled uplink transmissions. FIG. 1 for example shows that the scheduling node 14 may transmit yet another joint grant JG3 in a similar fashion in subframe s9, e.g., so as to interlace joint grants and uplink transmissions in an uninterrupted fashion. Regardless, the scheduling node 14 in interlacing embodiments may transmit a joint grant with a grant delay that is predetermined or adaptively selected, based on the detection herein, to prompt or otherwise provoke or maintain such interlacing. That is, the grant delay of any given joint grant is dynamically adapted as needed to initiate or maintain this interlacing. The grant delay may be dynamically adapted in this way, for example, by the scheduling node 14 adapting or selecting which subframe 22 is to be the earliest subframe 22 granted by a joint grant that is to be transmitted in a certain subframe. This may for instance reduce transmission latency and/or minimize the number of unused subframes as compared to an interlacing approach that does not base a joint grant's grant delay on such detection.

Figure 3:
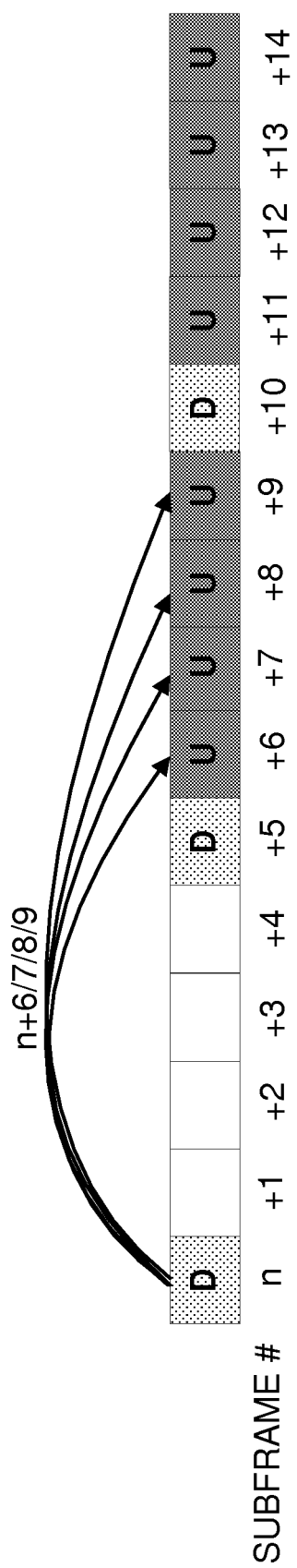
FIG. 3 is a subframe timing diagram showing uplink transmission scheduling according to some embodiments.

More particularly in this regard, FIG. 3 illustrates problems with an interlacing approach that does not base a joint grant's grant delay on the detection herein. Instead, the interlacing approach in FIG. 3 bases the grant delay of a joint grant solely on the number of subframes granted by the joint grant and the number of subframes needed for joint grant transmission. In the example, the scheduler (e.g., eNB) does not have downlink data in its buffer and needs to schedule multiple uplink subframes. Accordingly, the scheduler aims to interlace joint grants and uplink transmissions.

To prompt that interlacing, the scheduler transmits an initial joint grant in subframe n as a downlink (D) transmission. That initial joint grant grants L=4 subframes for uplink (U) transmission, where L is the number of uplink subframes scheduled by the joint grant. The scheduler determines the earliest one of those L=4 granted subframes to be subframe n+L+2, which is subframe n+6 with L=4. This means that the initial joint grant's grant delay is L+2=4+2=6 subframes. Such a grant delay of six subframes may account for a minimum delay $\delta$ required in order for a wireless communication device to be able to receive and process (e.g., decode) the joint grant in time for actually receiving an uplink transmission scheduled by the joint grant. In any event, this example assumes that the minimum required delay $\delta$ is 4 subframes (e.g., 4 ms where each subframe is 1 ms). The other subframes of the six subframe grant delay may account for the number of subframes needed for transmission of the initial joint grant as well as the number of subframes needed for transmission of another joint grant prior to expiration of the grant delay. As shown, the number of subframes for transmission of these joint grants is two: transmission of an initial joint grant occurs in one subframe n and transmission of an intermediate joint grant also occurs in one subframe n+5.

The scheduler may continue to transmit subsequent joint grants (e.g., in subframe n+10), each with a grant delay equal to L+2, where L is the number of subframes scheduled by that joint grant. In doing so, the scheduler may perfectly interlace joint grants and uplink transmissions, without leaving any unscheduled subframe.

While this interlacing approach avoids unscheduled subframes once interlacing begins, it leaves unscheduled subframes during the initial phase, i.e., right after transmission of the initial joint grant. As seen in FIG. 3, for example, subframes n+1 through n+4 remain unscheduled and therefore wasted. In general, this approach leaves n+1 to n+L-2 subframes unscheduled and wasted.

Basing grant delay on whether or not the scheduling node 14 has scheduled to receive on the unlicensed radio resource in a subframe, as described above, may address this problem. Indeed, some embodiments overcome this problem by providing an adaptive delay (between the joint grant transmitted at subframe n and the first uplink subframe granted) that is determined based on the planned transmission for subframe n+1 (i.e., the next subframe after joint grant transmission at subframe n). If subframe n+1 was previously granted for any of the wireless device as an uplink transmission, the joint grant transmitted in subframe n corresponds to an uplink burst starting at subframe n+L+2. The next joint grant transmission in this case will happen at subframe n+L+1. Otherwise, if subframe n+1 was not granted as an uplink subframe to any wireless device, the joint grant transmitted at subframe n corresponds to an uplink burst starting at subframe n+$\delta$, wherein $\delta$ is the minimum required delay. The next joint grant transmission in this case will happen at subframe n+$\delta$-1. This approach will minimize the number of unscheduled subframes in the initial phase (i.e., after the first joint grant or after synchronization is lost between a joint grant and an uplink data transmission).

Figure 4:
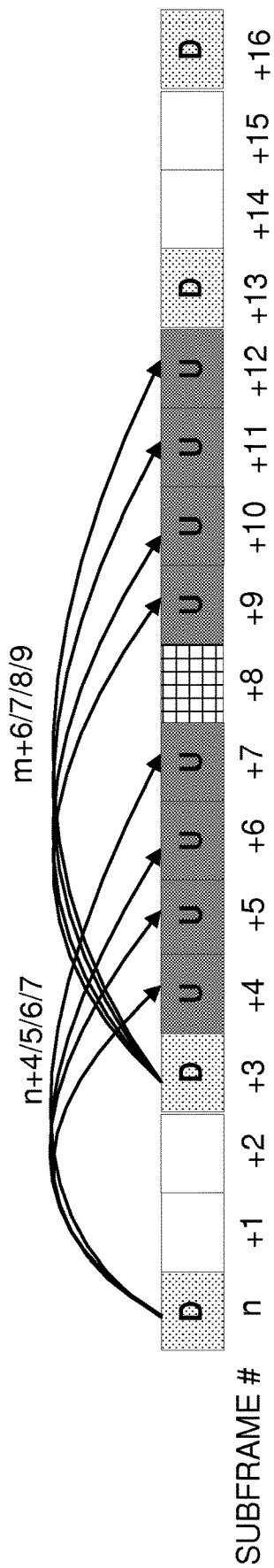
FIG. 4 is a subframe timing diagram showing uplink transmission scheduling according to some embodiments.

FIG. 4 shows a non-limiting example of this approach. In this example, $L=\delta=4$. During the initial phase, because the scheduling node 14 has not scheduled to receive in subframe n+1, the joint grant that the scheduling node 14 transmits in subframe n corresponds to an uplink burst starting at subframe n−δ=n+4 (i.e., with a grant delay of 4 subframes). The scheduling node 14 also schedules the next joint grant transmission to occur at subframe n+δ−1=n+3. This means only subframes n+1 and n+2 are left unscheduled. For the joint grant transmitted at m=n+3, that joint grant will correspond to an uplink burst starting at subframe m+L+2=m+6 (i.e., with a grant delay of 6 subframes), because the scheduling node 14 is scheduled to receive in subframe m+1. Moreover, even if the scheduling node 14 has to start its interlacing over, e.g., due to the failure to transmit a joint grant in subframe n+8, only two unscheduled scheduled subframe n+14 and n+15 will be wasted in this example.

Consider now embodiments where the scheduling node 14 transmits a joint grant with a grant delay that is based on whether or not the scheduling node 14 has transmitted on the unlicensed radio resource in a subframe. Referring back to FIG. 1, for example, the grant delay of joint grant JG1 may be based on whether or not the scheduling node 14 transmitted that joint grant JG1 itself on the unlicensed radio resource in a subframe s0. In some embodiments, for example, the scheduling node 14 may detect that it has not transmitted the joint grant JG1 in subframe s0. This may occur for instance if a CCA or LBT fails, indicating that the unlicensed radio resource is busy or otherwise controlled by another transmission or node, and making it to where the joint grant JG1 cannot be transmitted as planned. Responsive to detecting this, the scheduling node 14 may transmit the joint grant JG1 in a subsequent subframe s1, e.g., occurring (immediately) after the subframe s0 in which the scheduling node 14 failed to transmit the joint grant JG1. Yet the joint grant JG1 may still grant the same subframes s5-s8, despite being transmitted in the subsequent subframe s1, instead of the originally planned subframe s0. In this way, the delayed transmission timing of the joint grant JG1 effectively reduces the joint grant's grant delay, e.g., from 5 subframes down to 4 subframes.

In some embodiments, the scheduling node 14 may do so even if this subsequent subframe s1 was previously scheduled by the scheduling node 14 for uplink transmission (not shown in FIG. 1). The scheduling node 14 may for example transmit the joint grant JG1 and thereby control the subframe s1 before the CCA or LBT of a device 20 can succeed. In this sense, then, the scheduling node 14 may steal the subframe s1 back from a device 20 to which the scheduling node 14 previously granted the subframe s1. Regardless, though, the scheduling node 14 in some embodiments transmits the joint grant JG1 with a grant delay that is reduced by a difference in the number of subframes between the subframe s0 originally planned for transmission and the subsequent subframe s1 in which the transmission actually occurs (e.g., one subframe in this example). Although one subframe in this example, the difference may be greater if the scheduling node 14 is forced to delay transmission of the joint grant JG1 by more than a single subframe, e.g., if repeated failure occurs due to failing to control multiple subframes in a row.

Embodiments that base a grant delay on whether or not the scheduling node 14 has transmitted on the unlicensed radio resource in a subframe may be exploited to maintain interlacing between joint grants and uplink transmissions, even if the scheduling node 14 fails to transmit a joint grant in a subframe as planned.

Figure 5:
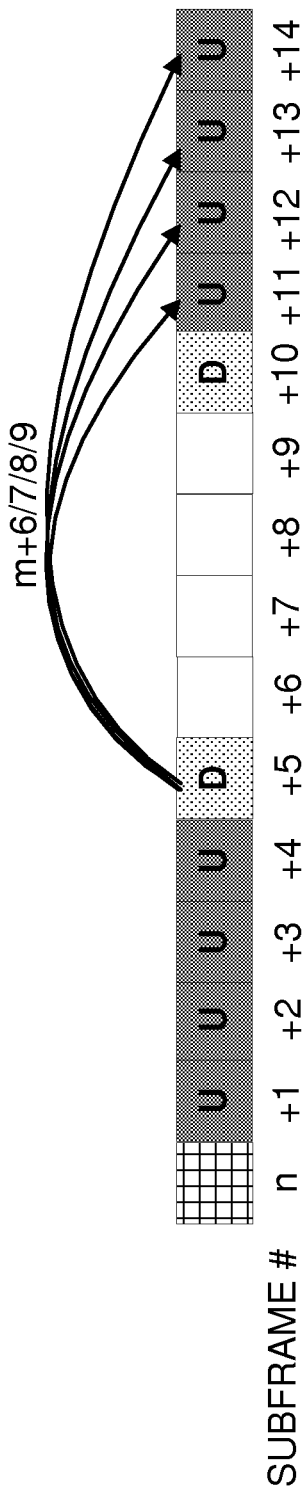
FIG. 5 is a subframe timing diagram showing uplink transmission scheduling according to some embodiments.

Indeed, perfect interlacing between joint grants and uplink transmissions may be threatened by the failure to transmit a joint grant. That is, if a joint grant transmission fails, subframes may otherwise go unscheduled and the initial phase of interlacing would otherwise have to be repeated again. FIG. 5 illustrates this problem that occurs when grant delay is not based on whether or not the scheduling node 14 has transmitted on the unlicensed radio resource in a subframe. When a joint grant transmission fails in subframe n (e.g., due to failed CCA), subframes n+6 through n+9 are left unscheduled (i.e., they are used neither for uplink nor downlink).

Figure 6:
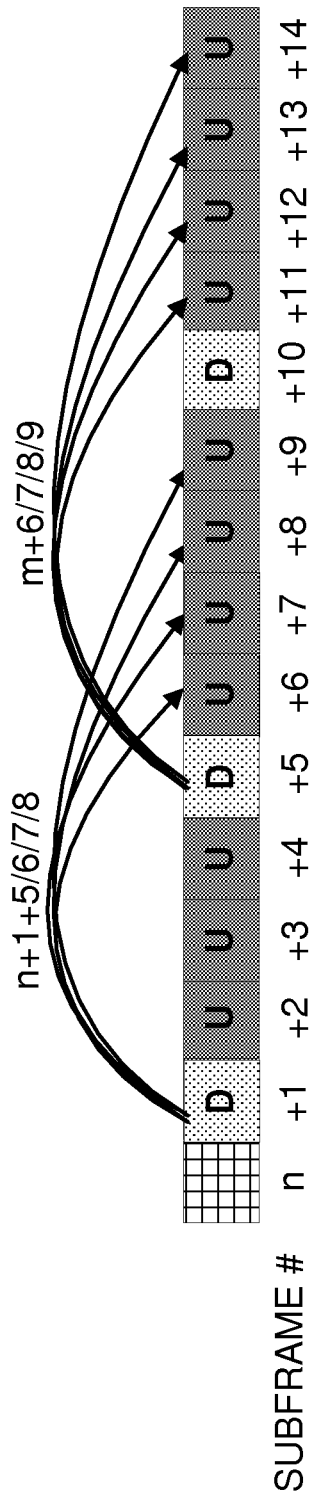
FIG. 6 is a subframe timing diagram showing uplink transmission scheduling according to some embodiments.

FIG. 6 by contrast illustrates one example of these embodiments where the scheduling node 14 transmits a joint grant with a grant delay that is based on whether or not the scheduling node has transmitted the joint grant over the unlicensed radio resource in a subframe, in order to maintain interlacing. In fact, in this example, the scheduling node 14 transmits the joint grant in a subframe previously scheduled by the scheduling node 14 for uplink transmission. That is, the scheduling node 14 overrides a subsequent uplink subframe in order to transmit a joint grant that it failed to transmit in a previous subframe.

In particular, FIG. 6 show that, after failing to transmit a joint grant at subframe n, the scheduling node 14 still attempts to transmit the joint grant during the subsequent subframes even though the subframes were previously granted for uplink transmission. The scheduling node 14 may for instance manage to finish its LBT and occupy the channel before the scheduled uplink transmission starts. In this case, the previously scheduled uplink transmission is cancelled or overridden. The scheduling node 14 my attempt to do this as long as the subframe index is less than n+L−δ+2. As shown in FIG. 6, for instance, the scheduling node 14 transmits the joint grant in subframe n+1, even though that subframe was previously granted for uplink transmission, responsive to failing to transmit the joint grant in subframe n. Moreover, the scheduling node 14 may transmit the joint grant in this later subframe, even without changing the uplink subframes granted by that joint grant. That is, no matter whether the joint grant is transmitted in subframe n or n+1, the grant still grants subframes n+6 through n+9. This has the effect of reducing the joint grant's grant delay. Even though this approach cancels a previously scheduled uplink subframe, it nonetheless maintains perfect interlacing between joint grants and uplink transmissions.

As these examples demonstrate, therefore, the scheduling node 14 may transmit a joint grant with a grant delay that is either equal to a certain number of subframes (e.g., 2) plus a number L of subframes granted by the joint grant or is less than the certain number of subframes plus a number of subframes granted by the joint grant, based respectively on whether the scheduling node 14 has or has not transmitted or scheduled to receive on the unlicensed radio resource in a subframe according to the detecting. In FIG. 6's example, for instance, the scheduling node 14 may transmit the joint grant with a grant delay equal to L+2 subframes if it successfully transmits the joint grant in subframe n, but may otherwise transmit the joint grant with a grant delay less than L+2 subframes if it only succeeds in transmitting the joint grant in a later subframe (e.g., n+1).

Note that embodiments described above may be employed separately or in combination. For example, the scheduling node 14 may be configured in some embodiments to transmit a joint grant in the way described above only based on detecting whether or not the scheduling node 14 has transmitted on the unlicensed radio resource in a subframe. As another example, the scheduling node 14 may be configured in some embodiments to transmit a joint grant in the way described above only based on detecting whether or not the scheduling node 14 has scheduled to receive on the unlicensed radio resource in a subframe. And as a further example, the scheduling node 14 may be configured in some embodiments to transmit a joint grant in the way described above based on detecting whether or not the scheduling node 14 has transmitted on the unlicensed radio resource in a subframe and also based on detecting whether or not the scheduling node 14 has scheduled to receive on the unlicensed radio resource in a susbframe.

Note further that while the above embodiments have been illustrated with transmission of a joint grant in a single subframe, the embodiments are equally applicable to transmission of a joint grant over multiple subframes. In this case, the last one of the multiple subframes may comprise a partial subframe, preceded by a full subframe.

Figure 7:
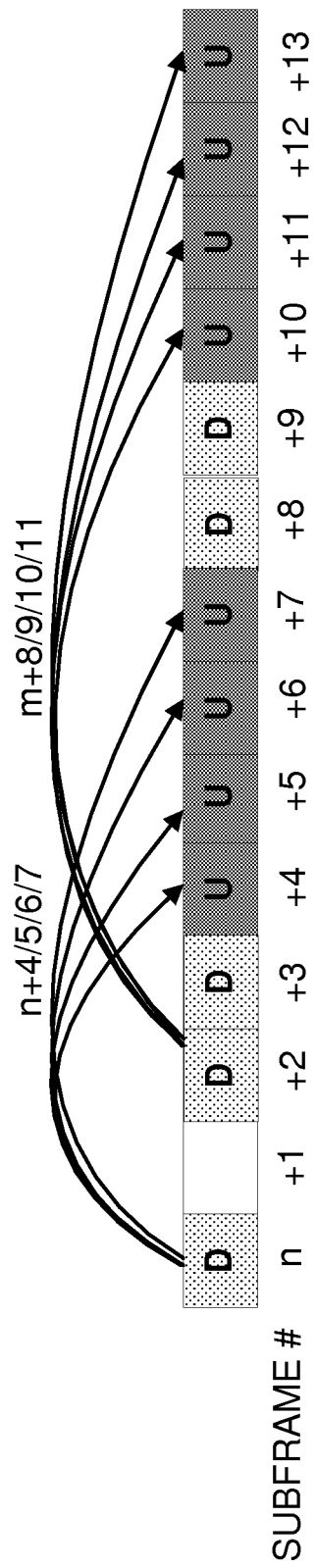
FIG. 7 is a subframe timing diagram showing uplink transmission scheduling according to some embodiments.

Indeed, to allow devices to start their uplink LBT before the subframe boundary, the scheduling node may end a downlink transmission with a partial subframe. One issue (e.g., with the release 13 LAA) is that a downlink ending partial subframe must be preceded by a full downlink subframe. This means that a grant transmission is always preceded by a full downlink subframe, as shown in FIG. 7.

In such case, the scheduling node 14 may adapt the delay between the joint grant transmission and the start of the uplink burst differently. If the scheduling node 14 is in the initial phase (e.g., no uplink subframes are granted), the joint grant transmission at subframe n will correspond to an uplink bust starting at n+$\delta$. The next joint grant transmission will then happen at subframe m (i.e. n+$\delta$−2), given that $\delta$>2 and that the next joint grant transmission will take 2 subframes. The joint grant transmission at m will last for both subframe m and partially m+1 to allow early start of uplink LBT at subframe m+1. The scheduling node 14 can use the subframe m to send a joint grant that corresponds to an uplink burst starting at m+L+4, again assuming that the next joint grant transmission will take 2 subframes.

Given that, if the scheduling node 14 fails to transmit the joint grant at subframe m, the scheduling node 14 can still attempt to grant the same uplink subframes by overriding any of the already planned uplink subframes, as long as the subframe index is still less than m+L+4−$\delta$. Instead, if the scheduling node 14 sends the grant in the partial subframe p (i.e. m+1), it will correspond to p+L+3. In case it fails to transmit the joint grant at subframe p, the scheduling node 14 can still attempt to grant the same uplink subframe by overriding any of the already planned uplink subframes, as long as the subframe index is still less than p+L+3-$\delta$.

In view of the embodiments above concerning transmission of a joint grant over one or more subframes, the scheduling node 14 may operate as described below. If the scheduling node 14 has no downlink data in its buffer, and the scheduling node 14 is in the initial phase of interlacing (e.g., no granted subframes yet), a joint grant transmitted by a downlink burst starting at subframe n may grant or correspond to an uplink burst starting at subframe n+$\delta$. The next downlink transmission will start at n+$\delta$+Tx_g2, wherein Tx_g2 is the number of subframes needed for the next joint grant transmission and where Tx_g2>=1. If for example the next joint grant is transmitted in a single full subframe, Tx_g2=1, whereas if the next joint grant is transmitted in a partial downlink subframe preceded by a full downlink subframe, Tx_g2=2. On the other hand, if the scheduling node 14 has no downlink data in its buffer, and the scheduling node 14 is in the interlacing phase (i.e., certain subframes are already granted for uplink transmission), a joint grant transmitted by a downlink burst starting at subframe n may grant or correspond to an uplink burst starting at subframe n+L+Tx_g1+Tx_g2, for L>=$\delta$ and where Tx_g1 is the number of subframes needed for the first joint grant transmission and where Tx_g1>=1. If for example the joint grant is transmitted in a single full subframe, Tx_g1=1, whereas if the joint grant is transmitted in a partial downlink subframe preceded by a full downlink subframe, Tx_g1=2 . . . . The next downlink transmission will start at n+Tx_g1+L.

Accordingly, note also that the scheduling node 14 in some embodiments selectively operates as described above responsive to a downlink buffer of the scheduling node 14 being empty. That is, the scheduling node 14 may only transmit a joint grant as described above (e.g., to provoke or maintain interlacing) if the scheduling node 14 does not have any downlink data to send.

In any event, because the grant delay of a joint grant may be variable, selectable, or adaptable, e.g., on a joint grant by joint grant basis, as described above, the scheduling node 14 may transmit a joint grant (e.g., JG1) with a grant delay different than that of another joint grant (e.g., JG2). For example, the scheduling node 14 in some embodiments may transmit the joint grant JG1 with a grant delay independent of a number of subframes granted by the joint grant (e.g., based exclusively on the minimum required delay). But the scheduling node 14 may transmit another joint grant JG2 with a grant delay that is indeed dependent on (e.g., a function of) a number of subframes granted by that joint grant JG2 (e.g., according to L+2). In this and other embodiments, therefore, the scheduling node 14 may transmit the joint grant JG1 with a grant delay that is less than that of another joint grant JG2. Alternatively or additionally, even if the scheduling node 14 has scheduled to receive an uplink transmission in a subframe, the scheduling node 14 may transmit the joint grant JG1 in that subframe with a grant delay different from that of another joint grant JG2.

Accordingly, the scheduling node 14 in some embodiments operates as described above responsive to detecting that the scheduling node 14 has not transmitted or scheduled to receive on the unlicensed radio resource in a subframe 22. For example, in one or more embodiments where the scheduling node 14 is configured to interlace joint grants with uplink transmissions, the scheduling node 14 may transmit a joint grant with a grant delay different than that of another joint grant, responsive to detecting that such interlacing is to start or resume (e.g., after being interrupted, as detected by the scheduling node 14 having not transmitted or scheduled to receive in a subframe).

Figure 8:
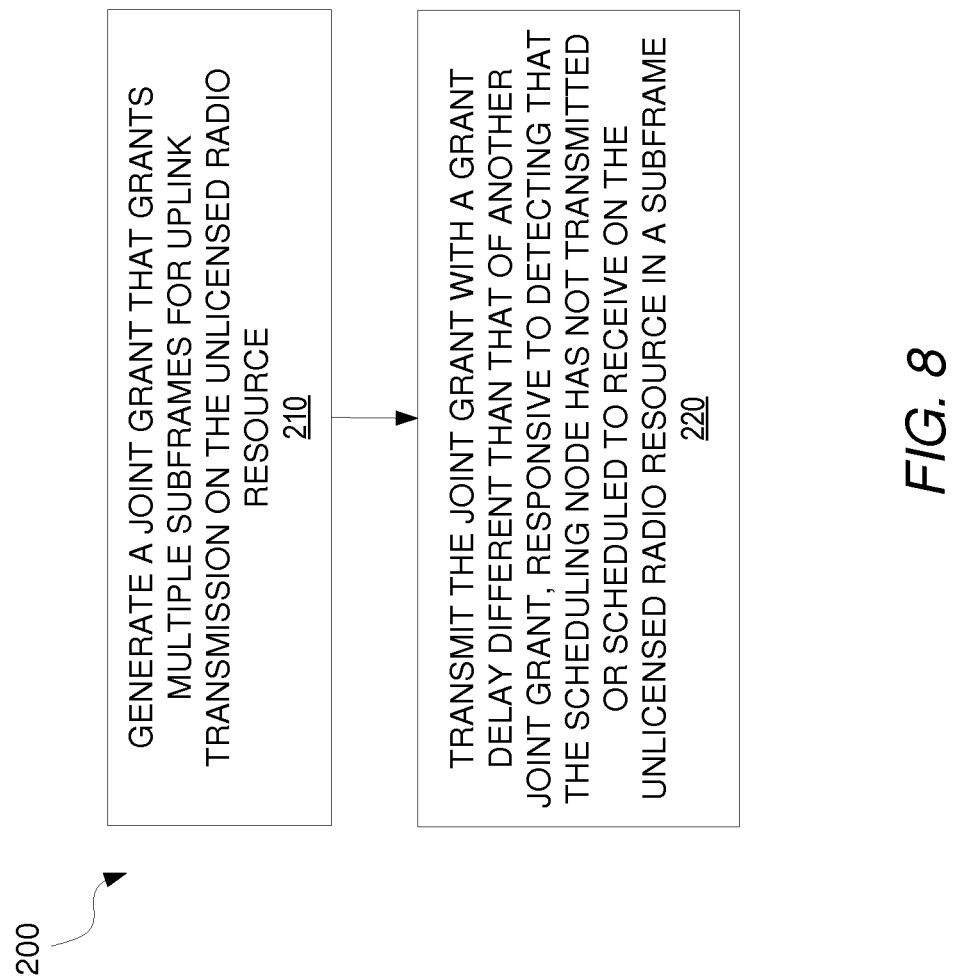
FIG. 8 is a logic flow diagram of a method performed by a scheduling node according to other embodiments.

With the above variations and modifications in mind, FIG. 8 illustrates a method 200 performed by a scheduling node 14 in a wireless communication system 10 for scheduling uplink transmissions 18 over an unlicensed radio resource according to other embodiments. As shown, the method 200 comprises generating a joint grant that grants multiple subframes for uplink transmission on the unlicensed radio resource (Block 210). The method also entails transmitting the joint grant with a grant delay different than that of another joint grant, responsive to detecting that the scheduling node 14 has not transmitted or scheduled to receive on the unlicensed radio resource in a subframe (Block 220).

Note that the scheduling node 14 herein may transmit a grant in one or more subframes 22. When the scheduling node 14 transmits a grant in a given subframe 22, the scheduling node 14 "controls" the unlicensed radio resource in that subframe 22 (e.g., since that grant transmission prevents other transmissions in the subframe). The scheduling node 14 as used herein may also be said to "control" a given subframe 22 when the scheduling node 14 receives an uplink transmission 18 that the scheduling node 14 scheduled to occur in that subframe 22. Indeed, even though a wireless communication device 20 may be the one transmitting in the subframe 22, it is the scheduling node 14 that controls the device's 20 transmissions, meaning that the scheduling node 14 effectively or indirectly controls a subframe 22 when that device 20 transmits in it. An uncontrolled subframe as used herein is therefore a subframe in which the scheduling node neither transmits a downlink transmission nor receives an uplink transmission that it scheduled.

With this understanding, some embodiments herein may be characterized as including a scheduling node that transmits a joint grant with a grant delay different than that of another joint grant, responsive to detecting that the scheduling node has not controlled or has not scheduled to control the unlicensed radio resource in an uncontrolled subframe.

Figure 9:
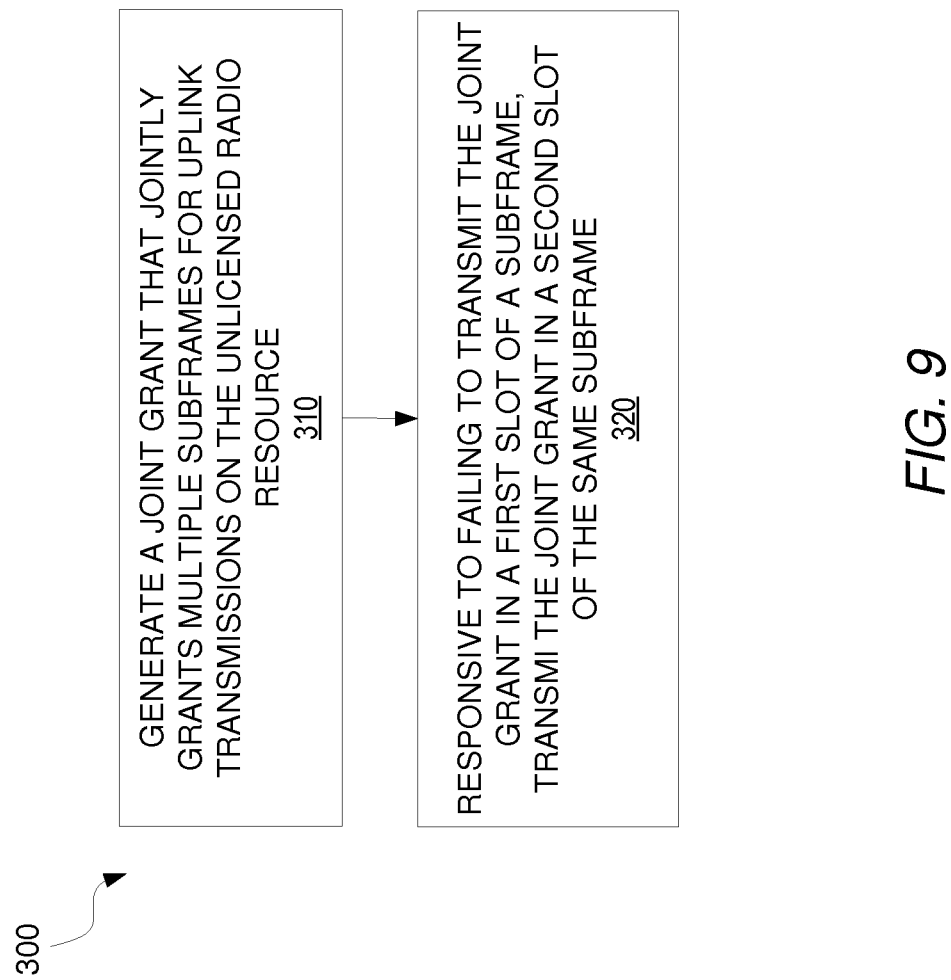
FIG. 9 is a logic flow diagram of a method performed by a scheduling node according to still other embodiments.

Alternatively or additionally, FIG. 9 illustrates a method 300 performed by a scheduling node 14 in a wireless communication system 10 for scheduling uplink transmissions 18 on an unlicensed radio resource. The method 300 comprises generating a joint grant that jointly grants multiple subframes for uplink transmissions on the unlicensed radio resource (Block 310). The method 300 also entails, responsive to failing to transmit the joint grant in a first slot of a subframe, transmitting the joint grant in a second slot of the same subframe (Block 320). This may occur for instance responsive to CCA or LBT failure in the first slot.

In some embodiments, for example, the second slot of a subframe is exploited as an additional transmission opportunity for a joint grant. Rather than waiting to transmit a joint grant in another subframe upon transmission failure in the subframe's first slot, these embodiments transmit the joint grant in a partial subframe (in the sense that transmissions occupy only a part of the subframe). Indeed, in some embodiments, the scheduling node 14 refrains from transmitting in the first slot of the subframe (e.g., responsive to CCA or LBT failure).

Figure 10:
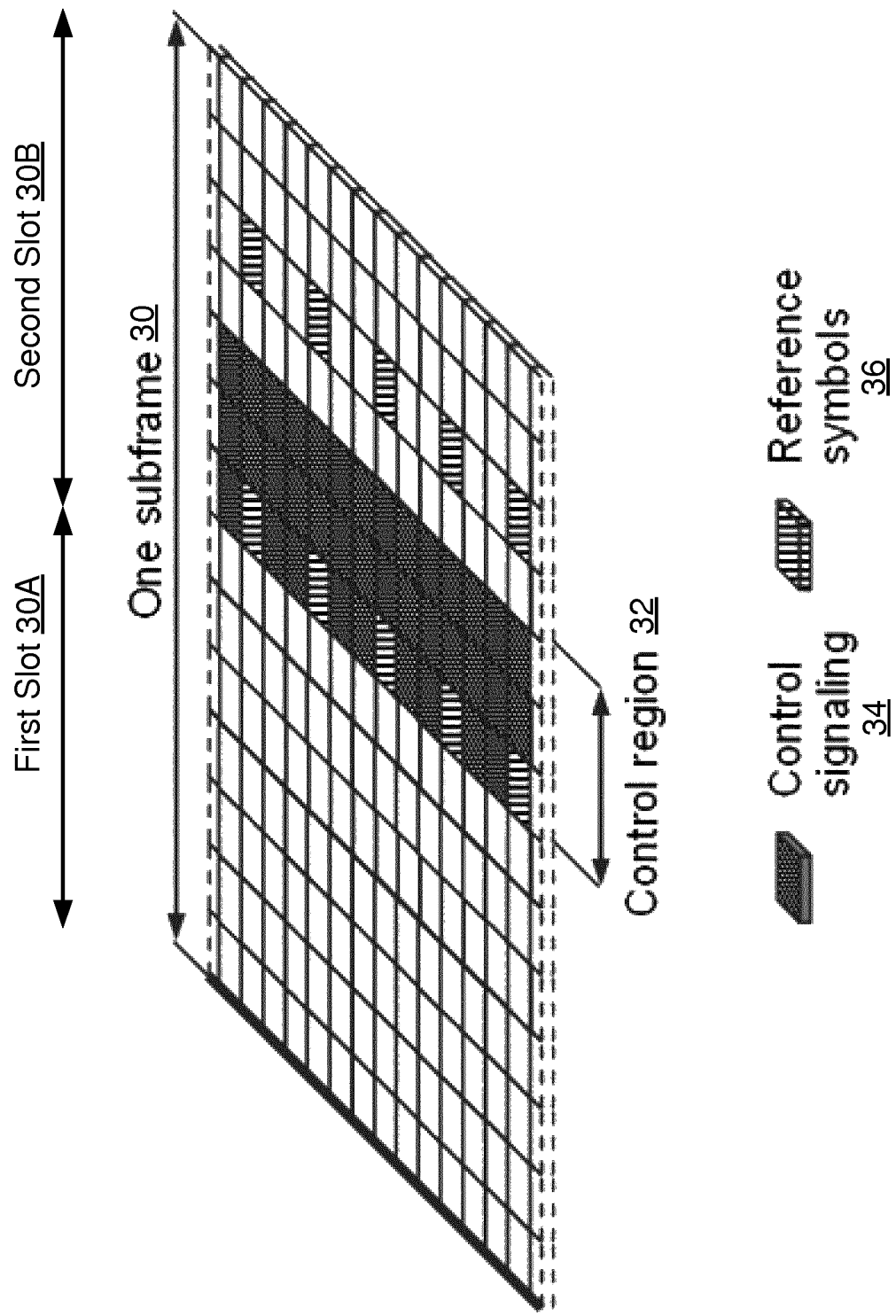
FIG. 10 is a block diagram of a subframe according to some embodiments.

More particularly, in order to reduce grant transmission overhead, a new scheduling method is defined based on a downlink starting partial subframe. As illustrated in FIG. 10 with reference to a subframe 30 that comprises two slots 30A and 30B consistent with Long Term Evolution (LTE) standards, nothing is transmitted by the scheduling node 14 in the first slot 30A of a downlink subframe 30. Instead, the signals that normally reside in the first slot 30A are moved into the second slot 30B, such that the control region 32 is moved from the first slot 30A to the second slot 30B. These signals include for instance control signaling 34 and reference symbols 36. By enabling a starting partial subframe to transmit uplink grants, control channel overhead can be further reduced.

For example, in LTE, uplink grants can be transmitted via two physical channels: physical downlink control channel (PDCCH) in the control region 32 and the enhanced physical downlink control channel (EPDCCH). When a scheduling node is transmitting only uplink scheduling grants without downlink data, these two transmission schemes heretofore require a full downlink subframe (1 ms). This poses an overhead which may be addressed using the partial subframe approach in FIG. 10.

Note also that using the starting partial subframes gives the scheduling node 14 two chances to transmit uplink grants in a busy channel condition. The scheduling node 14 performs LBT before the subframe boundary. If the channel is available, the scheduling node 14 can decide to transmit control channel starting in the first slot. If the channel is not available before the subframe boundary, the scheduling node 14 can continue to perform LBT and check whether the channel becomes available before the boundary of the second slot.

Given the description above, one or more embodiments herein generally adjust the delay between a joint grant transmission and the start of the corresponding uplink burst to minimize the overhead. In some embodiments, for example, a scheduling node does not have downlink data in buffer and needs to schedule multiple uplink subframes. One or more embodiments herein include different joint grant transmission methods with adaptive delay between grant transmission and the corresponding uplink burst start time to reduce the latency overhead before the start of the uplink transmission.

In some embodiments, the following advantages are realized: (1) uplink throughput improvement for LAA/stand-alone LTE-U; and/or (2) Enables improved coexistence between LAA/standalone LTE-U and Wi-Fi in single carrier or multi-carrier deployments.

Figure 11:
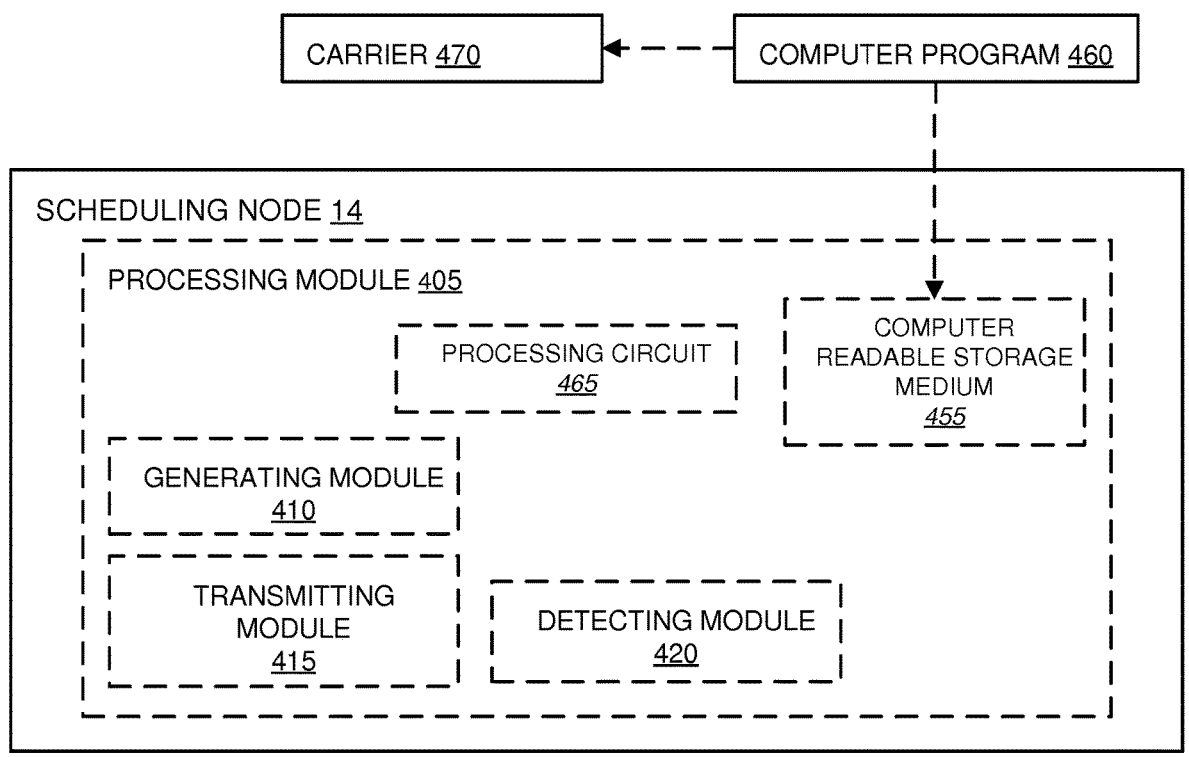
FIG. 11 is a block diagram of a scheduling node according to some embodiments.

In view of the above modifications and variations, those skilled in the art will appreciate that the scheduling node 14 may be configured to perform any of the methods 100, 200, 300, or other processing herein by any functional means or units. For example, FIG. 11 illustrates one or more embodiments where the scheduling node 14 comprises a processing module 405. The processing module 405 may be a means, one or more hardware modules and/or one or more software modules for performing the methods described herein.

More particularly, FIG. 11 shows the processing module 405 as comprising in some embodiments a generating module 410, and a transmitting module 415, e.g., for implementing the method in FIG. 8 or FIG. 9. In some embodiments for example the generating module 410 is for generating a joint grant that grants multiple subframes for uplink transmission on the unlicensed radio resource. And the transmitting module 415 is for transmitting the joint grant with a grant delay different than that of another joint grant, responsive to detecting that the scheduling node has not transmitted or scheduled to receive on the unlicensed radio resource in a subframe.

In other embodiments, the generating module 410 is for generating a joint grant that jointly grants multiple subframes for uplink transmissions on the unlicensed radio resource. And the transmitting module 415 is for, responsive to failing to transmit the joint grant in a first slot of a subframe, transmitting the joint grant in a second slot of the same subframe.

In still other embodiments, the processing module 405 comprises a detecting module 420 for detecting whether or not the scheduling node has transmitted or scheduled to receive on the unlicensed radio resource in a subframe. In this case, the transmitting module 415 may be for transmitting a joint grant with a grant delay that is based on whether or not the scheduling node has transmitted or scheduled to receive on the unlicensed radio resource in a subframe according to the detecting.

Alternatively or additionally, the scheduling node 14 may comprise a computer readable storage medium 455, such as a memory. The computer readable storage medium 455 may comprise, such as contain or store, a computer program 460.

According to some embodiments herein, the processing module 405 comprises, e.g. 'is embodied in the form of' or 'realized by', a processing circuit 465 as an exemplifying hardware module. In these embodiments, the computer readable storage medium 455 may comprise the computer program 460, comprising computer readable code units executable by the processing circuit 465, whereby the scheduling node 14 is operative to perform the methods of e.g. FIGS. 2, 8, and/or 9.

FIG. 11 further illustrates a carrier 470, that may comprise the computer program 460 described directly above. The carrier 470 may be one of an electronic signal, an optical signal, a radio signal, and a computer readable storage medium (e.g., computer readable storage medium 455).

It should thus be understood that the functional means or units for implementing the methods in FIGS. 2, 8, and/or 9 in one embodiment is hardware and in another embodiment is implemented with the help of software and in yet other embodiments are a mix between hardware-implemented functions and software-implemented functions.

In one embodiment, the scheduling node 14 comprises respective circuits or circuitry configured to perform the steps shown in FIGS. 2, 8, and/or 9. The circuits or circuitry in this regard may comprise circuits dedicated to performing certain functional processing and/or one or more microprocessors in conjunction with memory. The scheduling node 14 in this regard may comprise one or more processing circuits (e.g., a processor). The processing circuit(s) may be operatively connected to a memory circuit. The memory circuit stores program instruction and data used by the one or more processing circuits to perform its functions.

The one or more processing circuits may include, for example, one or more microprocessors, microcontrollers, digital signal processors, ASICs, or the like, configured with appropriate software and/or firmware to carry out one or more of the techniques discussed above. The memory circuit 504 may comprise one or several types of memory such as read only memory (ROM), random-access memory, cache memory, flash memory devices, optical storage devices, etc. The memory circuit may include program instructions for obtaining the location of a subscriber according to one or more of the techniques described herein.

One or more embodiments herein include corresponding processing at a wireless communication device 20.

A radio network node herein is any type of network node (e.g., a base station) capable of communicating with another node over radio signals. A wireless communication device is any type device capable of communicating with a radio network node over radio signals. A wireless communication device may therefore refer to a machine-to-machine (M2M) device, a machine-type communications (MTC) device, a NB-IoT device, etc. . . . . The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

At least some embodiments herein operate based on Long Term Evolution, e.g., as deployed in unlicensed spectrum as a complement to or replacement for licensed spectrum.

Figure 12:
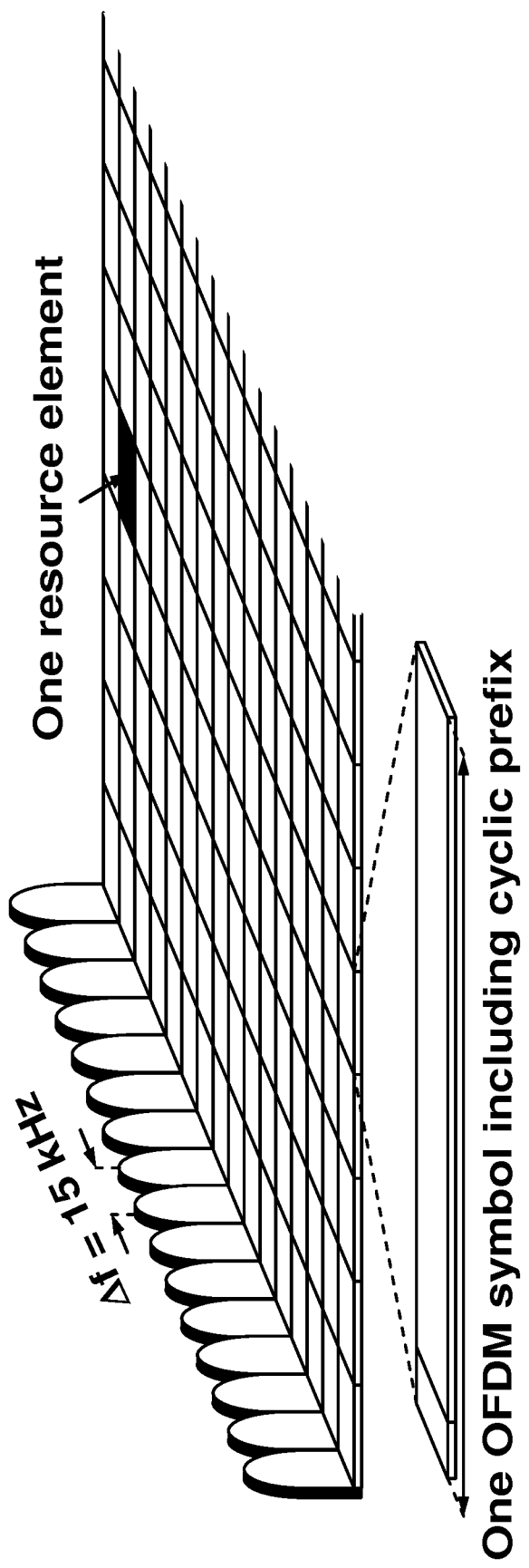
FIG. 12 is a block diagram of a resource block according to some embodiments.
Figure 13:
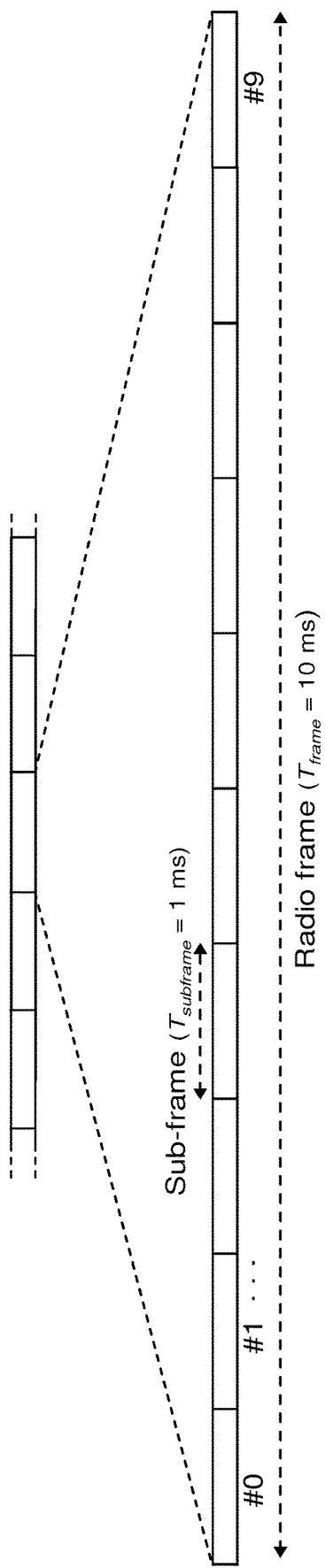
FIG. 13 is a block diagram of a subframe according to some embodiments.

LTE uses orthogonal frequency division multiplexing (OFDM) in the downlink and discrete Fourier transform (DFT)-spread OFDM (also referred to as single-carrier frequency division multiple access, FDMA) in the uplink. The basic LTE downlink physical resource can thus be seen as a time-frequency grid as illustrated in FIG. 12, where each resource element corresponds to one OFDM subcarrier during one OFDM symbol interval. The uplink subframe has the same subcarrier spacing as the downlink and the same number of SC-FDMA symbols in the time domain as OFDM symbols in the downlink In the time domain, LTE downlink transmissions are organized into radio frames of 10 ms, each radio frame consisting of ten equally-sized subframes of length Tsubframe=1 ms as shown in FIG. 13. Each subframe comprises two slots of duration 0.5 ms each, and the slot numbering within a frame ranges from 0 to 9. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 14.

From LTE Rel-11 onwards, the above described resource assignments can also be scheduled on the enhanced Physical Downlink Control Channel (EPDCCH). For Rel-8 to Rel-10 only Physical Downlink Control Channel (PDCCH) is available.

Figure 14:
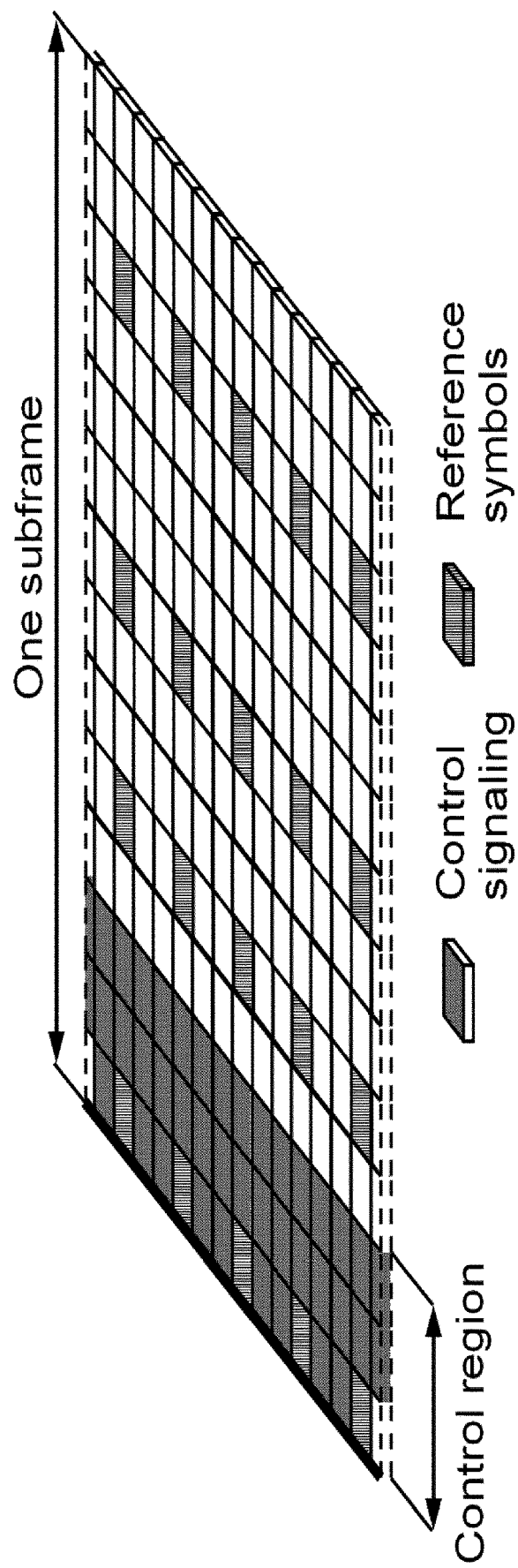
FIG. 14 is a block diagram of a subframe according to other embodiments.

The reference symbols shown in the above FIG. 14 are the cell specific reference symbols (CRS) and are used to support multiple functions including fine time and frequency synchronization and channel estimation for certain transmission modes.

In LTE, the uplink access is typically controlled by the eNB, i.e., scheduled. In this case the user equipment (UE) would report to the eNB when data is available to be transmitted, e.g., by sending a scheduling request message (SR). Based on this, the eNB would grant the resources and relevant information to the UE in order to carry out the transmission of a certain size of data. The assigned resources are not necessarily sufficient for the UE to transmit all the available data. Therefore, it is possible that the UE sends a buffer status report (BSR) control message in the granted resources, in order to inform the eNB about the correct size and updated size of the data waiting for transmission. Based on that, the eNB would further grant the resources to carry on with the UE uplink transmission of the corrected size of data.

In more detail, every time new data arrives at the UE's empty buffer, the following procedure should be performed:

Using the Physical Uplink Control Channel (PUCCH), the UE informs the network that it needs to transmit data by sending a Scheduling Request (SR) indicating that it needs uplink access. The UE has a periodic timeslots for SR transmissions (typically on a 5, 10, or 20 ms interval).

Once the eNB receives the SR request bit, it responds with a small "uplink grant" that is just large enough to communicate the size of the pending buffer. The reaction to this request typically takes 3 ms.

After the UE receives and processes (takes about 3 ms) its first uplink grant, it typically sends a Buffer Status Report (BSR) that is a MAC Control Element (MAC CE) used to provide information about the amount of pending data in the uplink buffer of the UE. If the grant is big enough, the UE sends data from its buffer within this transmission as well. Whether the BSR is sent depends also on conditions specified in 3GPP TS 36.321.

The eNB receives the BSR message, allocates the necessary uplink resources and sends back another uplink grant that will allow the device to drain its buffer.

Adding it all up, about 16 ms (+time to wait for PUCCH transmission opportunity) of delay can be expected between data arrival at the empty buffer in the UE and reception of this data in the eNB.

In case the UE is not RRC connected in LTE or lost its uplink synchronization since it did not transmit or receive anything for a certain time, the UE would use the random access procedure to connect to the network, obtain synchronization and also send the SR. If this is the case the procedure until the data can be sent would take even longer than the SR transmission on PUCCH.

Figure 15:
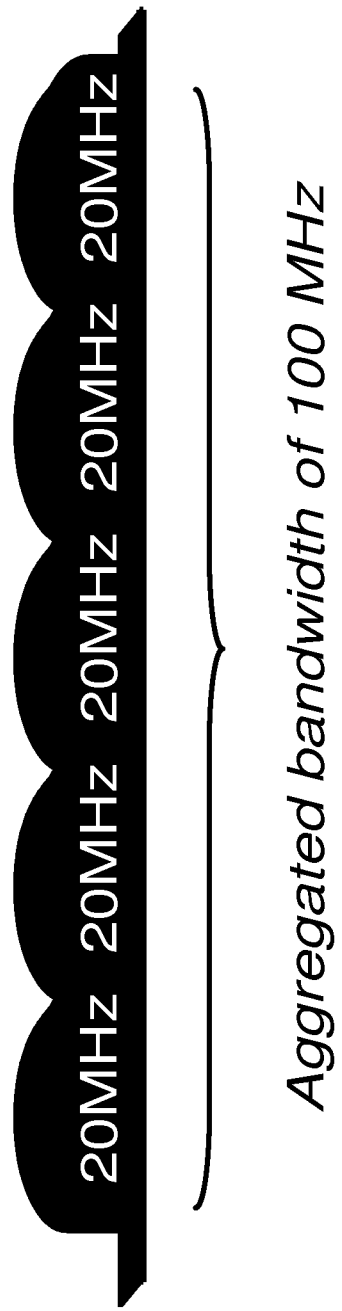
FIG. 15 is a block diagram of carrier aggregation according to some embodiments.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 15. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling. The mapping from (E)PDCCH to PDSCH is also configured semi-statically.

The spectrum used by LTE has traditionally been dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services.

Therefore, a new study item has been initiated in 3GPP on extending LTE to exploit unlicensed spectrum in addition to licensed spectrum. Unlicensed spectrum can, by definition, be simultaneously used by multiple different technologies.

Today, the unlicensed 5 GHz spectrum is mainly used by equipment implementing the IEEE 802.11 Wireless Local Area Network (WLAN) standard. This standard is known under its marketing brand "Wi-Fi."

Figure 16:
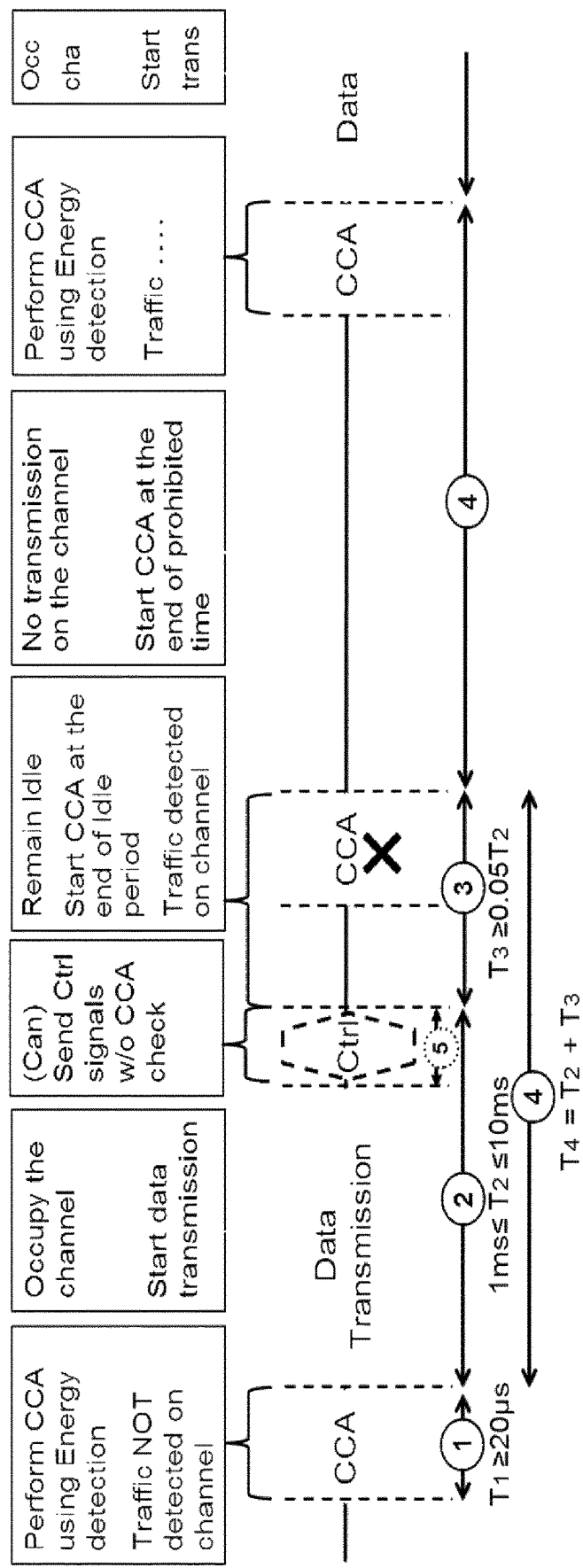
FIG. 16 is a timing diagram of a clear channel assessment according to some embodiments.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several APs using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism is shown in FIG. 16. LBT involves sensing the medium for a pre-defined minimum amount of time and backing off if the channel is busy.

Figure 17:
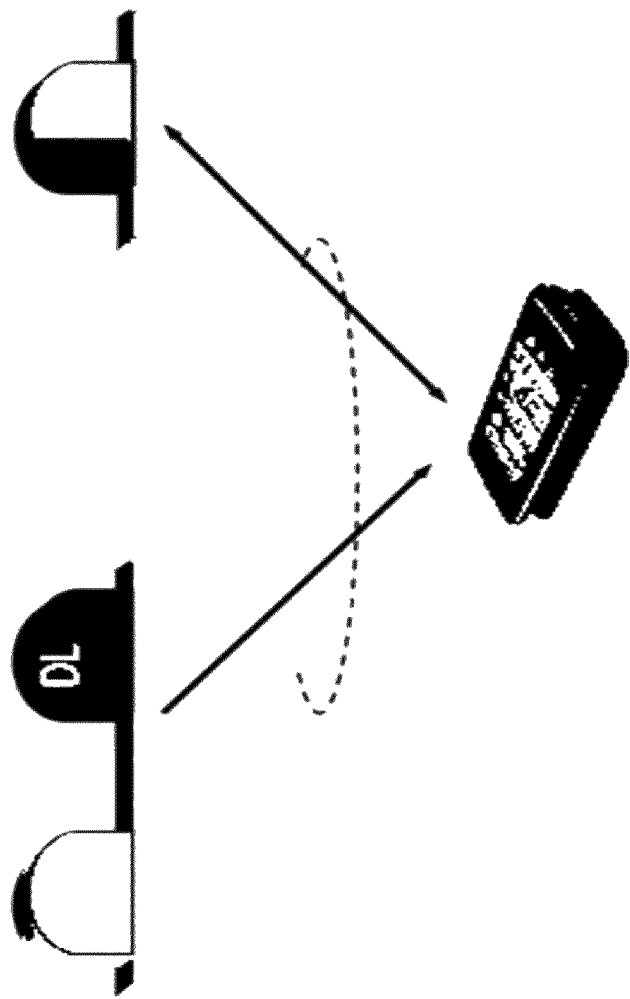
FIG. 17 is a block diagram of license-assisted access according to some embodiments.

One way to utilize the unlicensed spectrum reliably is to transmit essential control signals and channels on a licensed carrier. That is, as shown in FIG. 17, a UE is connected to a PCell in the licensed band and one or more SCells in the unlicensed band. A secondary cell in unlicensed spectrum may be denoted as licensed-assisted access secondary cell (LAA SCell).

In particular, the ongoing 3GPP Rel-13 study item "Licensed-Assisted Access" (LAA) intends to allow Long Term Evolution (LTE) equipment to also operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

That said, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

One way to facilitate coexistence is to perform LBT prior to transmitting on the unlicensed spectrum. An uplink LBT for example is performed prior to an uplink transmission based on a previously-received uplink resource grant sent by the scheduling SCell or PCell. Multiple UEs may perform LBT procedures in parallel if they have been scheduled in the same UL subframe.

Figure 18:
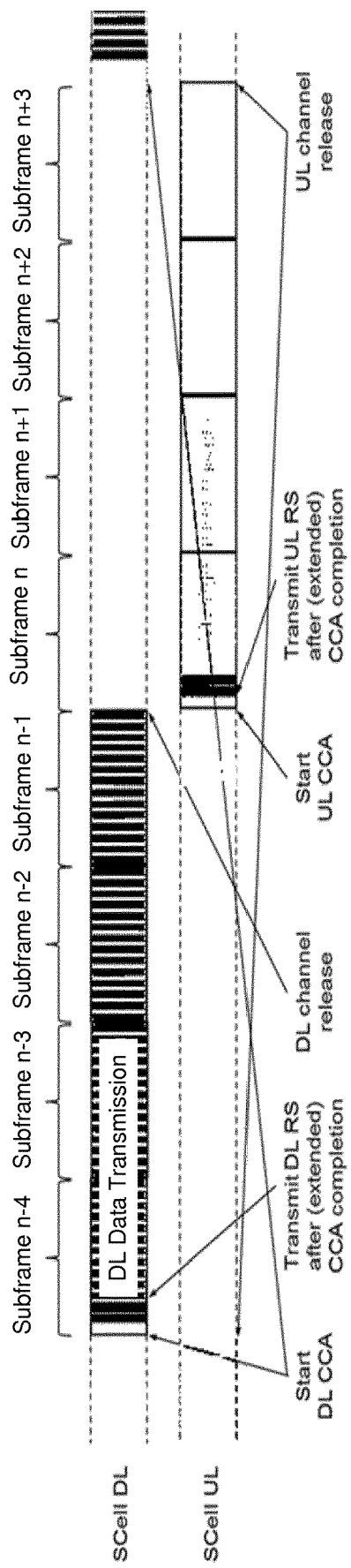
FIG. 18 is a block diagram of a clear channel assessment for LAA according to some embodiments.

An example of an LAA UL transmission spanning several subframes subsequent to a successful UL LBT procedure is shown in FIG. 18. Note that the choice of parameters used in the LBT procedure prior to accessing the channel have a major impact on inter-RAT coexistence and throughput.

Given the description above, one or more embodiments herein include a method performed by a scheduling node (e.g., a base station) in a wireless communication system (e.g., LTE-U, LAA, MulteFire, etc.) for scheduling uplink transmissions over an unlicensed radio resource (e.g., an unlicensed frequency band or spectrum). The method comprises generating a joint grant that grants multiple subframes for uplink transmission on the unlicensed radio resource. The method also comprises transmitting the joint grant with a grant delay different than that of another joint grant, responsive to detecting that the scheduling node has not transmitted or scheduled to receive on the unlicensed radio resource in a subframe.

In some embodiments, said transmitting is responsive to detecting that the scheduling node has not scheduled to receive on the unlicensed radio resource in a subframe. In this case, said detecting may comprise detecting that no uplink transmission is scheduled to occur after transmission of the joint grant. Alternatively or additionally, said detecting may comprise detecting that a subframe occurring immediately after a subframe in which the joint grant is to be transmitted is not granted for uplink transmission.

In some embodiments, said transmitting comprises transmitting the joint grant with a grant delay equal to a minimum required delay.

In some embodiments, said transmitting comprises transmitting the joint grant with a grant delay independent of a number of subframes granted by the joint grant. In this case, according to some embodiments, after transmitting the joint grant, the method may comprise transmitting another joint grant with a grant delay greater than the minimum required delay.

In some embodiments, said transmitting is responsive to detecting that the scheduling node has not transmitted on the unlicensed radio resource in a subframe.

In some embodiments, said transmitting is responsive to detecting failure to transmit the joint grant in the subframe.

In some embodiments, said transmitting comprises transmitting the joint grant in a subsequent subframe occurring after the subframe. In this case, said transmitting may comprise transmitting the joint grant with a grant delay that is less than that of another joint grant by a difference in the number of subframes between the subframe and the subsequent subframe.

In some embodiments, said transmitting comprises transmitting the joint grant in a subframe previously scheduled by the scheduling node for uplink transmission.

In some embodiments, the method comprises transmitting the joint grant with a grant delay that is less than that of another joint grant.

In some embodiments, the method comprises transmitting another joint grant with a grant delay that is a function of a number of subframes granted by the another joint grant.

In some embodiments, the method comprises transmitting another joint grant with a grant delay that equals two subframes plus a number of subframes granted by the another joint grant.

In some embodiments, the method comprises transmitting the joint grant in a single subframe. Alternatively, the method comprises transmitting the joint grant over multiple subframes, with a last one of the multiple subframes comprising a partial subframe preceded by a full subframe.

In some embodiments, the method comprises provoking uninterrupted interlacing of joint grants and scheduled uplink transmissions by said transmitting. In this case, the method may comprise performing said transmitting responsive to detecting that said interlacing has been interrupted.

In some embodiments, said transmitting comprises, responsive to failing to transmit the joint grant in a first slot of a subframe, transmitting the joint grant in a second slot of the same subframe.

In some embodiments, the scheduling node performs said transmitting also responsive to a downlink buffer of the scheduling node being empty.

In some embodiments, the wireless communication system is a Long Term Evolution (LTE) system deployed at least in part in the unlicensed radio resource.

In some embodiments, the scheduling node is a base station.

Other embodiments herein include a scheduling node in a wireless communication system for scheduling uplink transmissions on unlicensed radio resource. The scheduling node is configured to generate a joint grant that grants multiple subframes for uplink transmission on the unlicensed radio resource. The scheduling node is also configured to transmit the joint grant with a grant delay different than that of another joint grant, responsive to detecting that the scheduling node has not transmitted or scheduled to receive on the unlicensed radio resource in a subframe.

In some embodiments, the scheduling node is a base station.

The scheduling node may be configured to perform the method of any of the embodiments described above.

Other embodiments herein include a scheduling node in a wireless communication system for scheduling uplink transmissions on unlicensed radio resource. The scheduling node comprises a generating module for generating a joint grant that grants multiple subframes for uplink transmission on the unlicensed radio resource. The scheduling node also comprises a transmitting module for transmitting the joint grant with a grant delay different than that of another joint grant, responsive to detecting that the scheduling node has not transmitted or scheduled to receive on the unlicensed radio resource in a subframe.

Still other embodiments include a method performed by a scheduling node in a wireless communication system for scheduling uplink transmissions on unlicensed radio resource. The method comprises generating a joint grant that jointly grants multiple subframes for uplink transmissions on the unlicensed radio resource. The method also comprises, responsive to failing to transmit the joint grant in a first slot of a subframe, transmitting the joint grant in a second slot of the same subframe.

In some embodiments, the scheduling node performs said transmitting also responsive to a downlink buffer of the scheduling node being empty.

In some embodiments, said transmitting comprises transmitting the joint grant in a control region of the second slot.

In some embodiments, said transmitting comprises refraining from transmitting any downlink data in a data region of the subframe.

In some embodiments, said transmitting comprises refraining from transmitting in the first slot of the subframe.

Yet other embodiments herein include a scheduling node in a wireless communication system for scheduling uplink transmissions on unlicensed radio resource. The scheduling node is configured to generate a joint grant that jointly grants multiple subframes for uplink transmissions on the unlicensed radio resource. The scheduling node is also configured to, responsive to failing to transmit the joint grant in a first slot of a subframe, transmit the joint grant in a second slot of the same subframe.

In some embodiments, the scheduling node is a base station.

The scheduling node may be configured to perform the method of any of the embodiments described above.

Other embodiments herein include a scheduling node in a wireless communication system for scheduling uplink transmissions on unlicensed radio resource. The scheduling node comprises a generating module for generating a joint grant that jointly grants multiple subframes for uplink transmissions on the unlicensed radio resource. The scheduling node further comprises a transmitting module for, responsive to failing to transmit the joint grant in a first slot of a subframe, transmitting the joint grant in a second slot of the same subframe.

Further embodiments include a computer program comprising instructions which, when executed by at least one processor of a scheduling node, causes the scheduling node to carry out the method of any of the embodiments herein.

Moreover, embodiments also include a carrier containing the computer program. The carrier may be one of an electronic signal, optical signal, radio signal, or computer readable storage medium.

Those skilled in the art will recognize that the present invention may be carried out in other ways than those specifically set forth herein without departing from essential characteristics of the invention. The present embodiments are thus to be considered in all respects as illustrative and not restrictive.

What is claimed is:

1. A scheduling node in a wireless communication system for scheduling an uplink transmission on an unlicensed radio resource, the scheduling node comprising communication circuitry and processing circuitry whereby the scheduling node is configured to:
   detect whether or not the scheduling node has transmitted or scheduled to receive on the unlicensed radio resource in a subframe; and
   transmit a joint grant with a grant delay that is based on whether or not the scheduling node has transmitted or scheduled to receive on the unlicensed radio resource in a subframe according to the detecting, wherein the grant delay is a delay between transmission of the joint grant and an earliest one of multiple subframes granted by the joint grant for uplink transmission on the unlicensed radio resource.

2. The scheduling node of claim 1, configured to determine the grant delay with which the joint grant is to be transmitted, by determining the earliest one of the multiple subframes to be granted by the joint grant, based on whether or not the scheduling node has scheduled to receive on the unlicensed radio resource in a subframe according to the detecting.

3. The scheduling node of claim 2, configured to determine the earliest one of the multiple subframes to be later or earlier in time based respectively on whether the scheduling node has or has not scheduled to receive on the unlicensed radio resource in a subframe according to the detecting.

4. The scheduling node of claim 1, configured to transmit the joint grant with a grant delay that is either greater than a minimum required delay or equal to the minimum required delay based respectively on whether the scheduling node has or has not scheduled to receive on the unlicensed radio resource in a subframe according to the detecting.

5. The scheduling node of claim 1, configured to transmit the joint grant with a grant delay that is either dependent on or independent of a number of subframes granted by the joint grant based respectively on whether the scheduling node has or has not scheduled to receive on the unlicensed radio resource in a subframe according to the detecting.

6. The scheduling node of claim 1, configured to transmit the joint grant with a grant delay that is either equal to a certain number of subframes plus a number of subframes granted by the joint grant or is less than the certain number of subframes plus a number of subframes granted by the joint grant, based respectively on whether the scheduling node has or has not transmitted or scheduled to receive on the unlicensed radio resource in a subframe according to the detecting.

7. The scheduling node of claim 6, wherein the certain number of subframes is either two subframes, three subframes, or four subframes.

8. The scheduling node of claim 1, configured to detect whether or not the scheduling node has scheduled to receive on the unlicensed radio resource in a subframe.

9. The scheduling node of claim 7, configured to detect whether or not the scheduling node has scheduled to receive on the unlicensed radio resource in a subframe occurring after a subframe in which the joint grant is to be transmitted.

10. The scheduling node of claim 1, configured to detect whether or not the scheduling node has transmitted on the unlicensed radio resource in a subframe.

11. The scheduling node of claim 1, configured to detect whether or not the scheduling node has transmitted the joint grant in a subframe.

12. The scheduling node of claim 11, configured to, responsive to detecting that the scheduling node has not transmitted the joint grant in the subframe, transmit the joint grant in a subsequent subframe occurring after the subframe, with the joint grant still granting the same multiple subframes despite transmission in the subsequent subframe instead of the subframe.

13. The scheduling node of claim 1, configured to transmit the joint grant in a subframe previously scheduled by the scheduling node for uplink transmission.

14. The scheduling node of claim 1, configured to transmit the joint grant over multiple subframes, with a last one of the multiple subframes comprising a partial subframe preceded by a full subframe.

15. The scheduling node of claim 1, configured to provoke or maintain uninterrupted interlacing of joint grants and scheduled uplink transmissions by transmitting the joint grant with a grant delay that is based on whether or not the scheduling node has transmitted or scheduled to receive on the unlicensed radio resource in a subframe according to the detecting.

16. The scheduling node of claim 1, configured to transmit the joint grant in a second slot of a subframe.

17. The scheduling node of claim 16, configured to, responsive to failing to transmit the joint grant in a first slot of a subframe, transmit the joint grant in a second slot of the same subframe, the second slot occurring after the first slot.

18. The scheduling node of claim 1, configured to transmit the joint grant on the unlicensed radio resource.

19. The scheduling node of claim 1, wherein the scheduling node is a base station.

20. A method performed by a scheduling node in a wireless communication system for scheduling an uplink transmission on an unlicensed radio resource, the method comprising:
- detecting whether or not the scheduling node has transmitted or scheduled to receive on the unlicensed radio resource in a subframe; and
- transmitting a joint grant with a grant delay that is based on whether or not the scheduling node has transmitted or scheduled to receive on the unlicensed radio resource in a subframe according to the detecting, wherein the grant delay is a delay between transmission of the joint grant and an earliest one of multiple subframes granted by the joint grant for uplink transmission on the unlicensed radio resource.

\* \* \* \* \*